(12) United States Patent
Moffat et al.

(10) Patent No.: US 9,982,088 B2
(45) Date of Patent: May 29, 2018

(54) CARBOXYLIC ACID OR ACID SALT FUNCTIONALIZED POLYESTER POLYMERS

(71) Applicants: XEROX CORPORATION, Norwalk, CT (US); NATIONAL RESEARCH COUNCIL OF CANADA, Ottawa (CA)

(72) Inventors: Karen A. Moffat, Brantford (CA); Dragan Nikolic, Edmonton (CA); Valerie M. Farrugia, Oakville (CA); Jordan H. Wosnick, Toronto (CA); Andriy Kovalenko, Edmonton (CA); Alexander Kobryn, Edmonton (CA); Sergey Gusarov, Edmonton (CA)

(73) Assignees: XEROX CORPORATION, Norwalk, CT (US); NATIONAL RESEARCH COUNCIL OF CANADA, Ottawa (CA)

( * ) Notice: Subject to any disclaimer, the term of this patent is extended or adjusted under 35 U.S.C. 154(b) by 0 days. days.

(21) Appl. No.: 15/356,307

(22) Filed: Nov. 18, 2016

(65) Prior Publication Data

US 2017/0066872 A1    Mar. 9, 2017

Related U.S. Application Data

(60) Continuation of application No. 15/067,898, filed on Mar. 11, 2016, now Pat. No. 9,581,923, which is a division of application No. 13/316,585, filed on Dec. 12, 2011, now Pat. No. 9,354,530.

(51) Int. Cl.
| | |
|---|---|
| *C08G 63/16* | (2006.01) |
| *C08G 63/183* | (2006.01) |
| *C08G 63/91* | (2006.01) |
| *G03G 9/08* | (2006.01) |
| *G03G 9/087* | (2006.01) |
| *C08G 63/688* | (2006.01) |
| *G03G 9/093* | (2006.01) |

(52) U.S. Cl.
CPC ........... *C08G 63/183* (2013.01); *C08G 63/16* (2013.01); *C08G 63/688* (2013.01); *C08G 63/916* (2013.01); *G03G 9/0804* (2013.01); *G03G 9/0819* (2013.01); *G03G 9/0825* (2013.01); *G03G 9/08755* (2013.01); *G03G 9/08797* (2013.01); *G03G 9/09321* (2013.01); *G03G 9/09371* (2013.01)

(58) Field of Classification Search
CPC .................................................... C08G 63/16
See application file for complete search history.

(56) References Cited

U.S. PATENT DOCUMENTS

| | | |
|---|---|---|
| 3,590,000 A | 6/1971 | Palermiti et al. |
| 3,655,374 A | 4/1972 | Palermiti et al. |
| 3,720,617 A | 3/1973 | Chatterji et al. |
| 3,800,588 A | 4/1974 | Larson et al. |
| 3,847,604 A | 11/1974 | Hagenbach et al. |
| 3,944,493 A | 3/1976 | Jadwin et al. |
| 3,983,045 A | 9/1976 | Jugle et al. |
| 4,007,293 A | 2/1977 | Mincer et al. |
| 4,079,014 A | 3/1978 | Burness et al. |
| 4,298,672 A | 11/1981 | Lu |
| 4,338,390 A | 7/1982 | Lu |
| 4,394,430 A | 7/1983 | Jadwin et al. |
| 4,560,635 A | 12/1985 | Hoffend et al. |
| 4,935,326 A | 6/1990 | Creatura et al. |
| 4,937,166 A | 6/1990 | Creatura et al. |
| 5,236,629 A | 8/1993 | Mahabadi et al. |
| 5,278,020 A | 1/1994 | Gruskin et al. |
| 5,290,654 A | 3/1994 | Sacripante et al. |
| 5,302,486 A | 4/1994 | Patel et al. |
| 5,308,734 A | 5/1994 | Sacripante et al. |
| 5,330,874 A | 7/1994 | Mahabadi et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,827,633 A | 10/1998 | Ong et al. |
| 5,840,462 A | 11/1998 | Foucher et al. |
| 5,853,944 A | 12/1998 | Foucher et al. |
| 5,858,601 A | 1/1999 | Ong et al. |
| 5,863,698 A | 1/1999 | Patel et al. |
| 5,869,215 A | 2/1999 | Ong et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 6,004,714 A | 12/1999 | Ciccarelli et al. |
| 6,143,457 A | 11/2000 | Carlini et al. |
| 6,190,815 B1 | 2/2001 | Ciccareli et al. |
| 6,214,507 B1 | 4/2001 | Sokol et al. |
| 6,830,860 B2 | 12/2004 | Sacripante et al. |
| 7,312,011 B2 | 12/2007 | Patel et al. |
| 7,335,453 B2 | 2/2008 | Sacripante et al. |
| 7,736,831 B2 | 6/2010 | Lai et al. |
| 7,749,672 B2 | 7/2010 | Farrugia |
| 2005/0123847 A1* | 6/2005 | Kim .................. G03G 9/08755 430/109.4 |
| 2010/0222521 A1 | 9/2010 | Farrugia |
| 2011/0014564 A1 | 1/2011 | Moffat et al. |
| 2011/0033794 A1* | 2/2011 | Watanabe ............ G03G 9/0804 430/105 |

\* cited by examiner

*Primary Examiner* — Michael Pepitone
(74) *Attorney, Agent, or Firm* — Pillsbury Winthrop Shaw Pittman LLP

(57) ABSTRACT

The present disclosure describes a polyester that contains plural pendant adjacent carboxylic acid or acid salt side groups for use in making a toner for use in imaging devices.

18 Claims, 1 Drawing Sheet

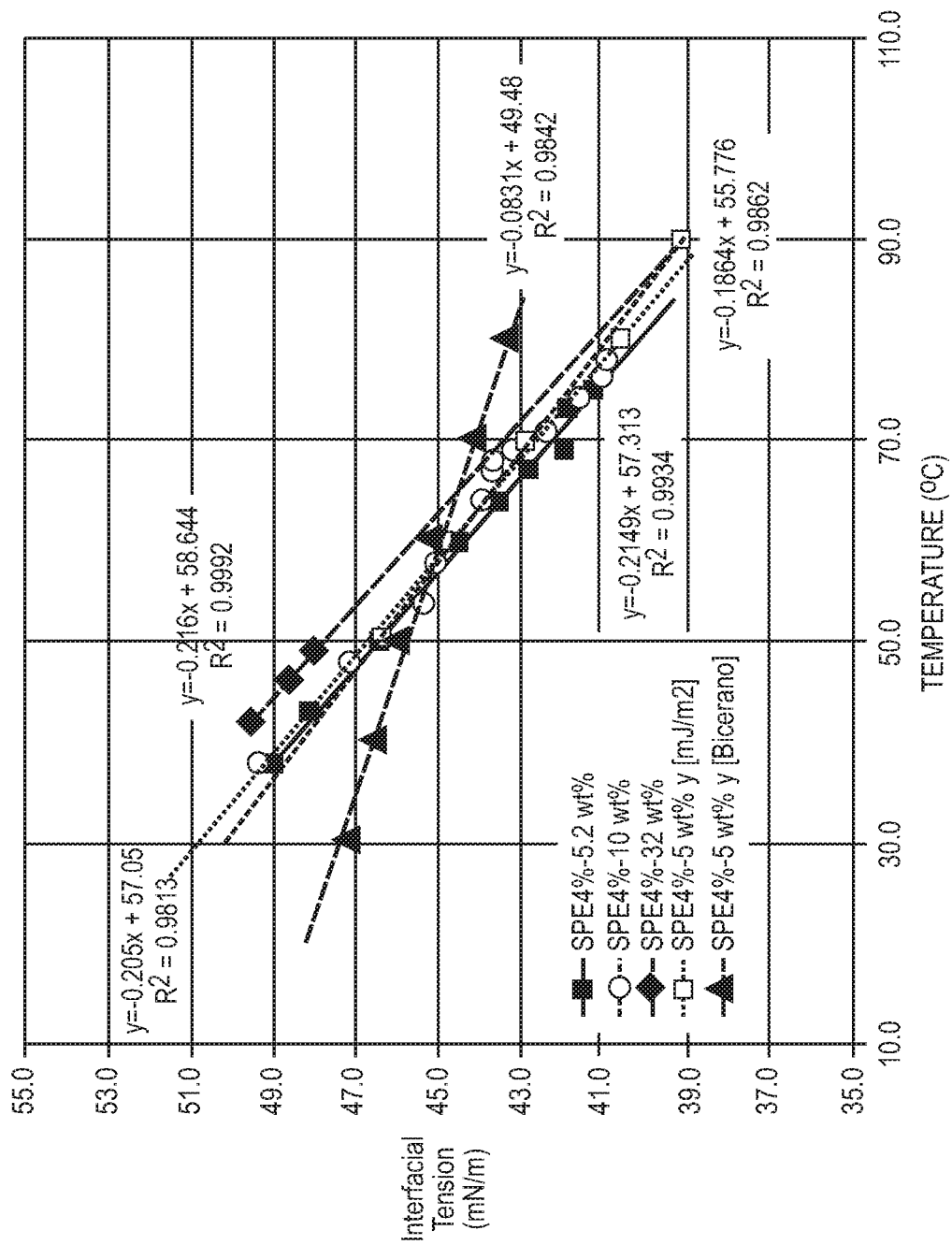

CARBOXYLIC ACID OR ACID SALT FUNCTIONALIZED POLYESTER POLYMERS

RELATED APPLICATIONS

This application is a continuation of U.S. application Ser. No. 15/067,898, which is in turn a divisional of U.S. application Ser. No. 13/316,585, now U.S. Pat. No. 9,354,530, which are both expressly incorporated by reference.

FIELD

The disclosure relates generally to polyester resins suitable for use in imaging systems, where the resins contain adjacent pendant carboxylic acid or acid salt groups and the resin self-assembles into micelles/particles on cooling. The resins can be used to construct toner for use in imaging devices.

BACKGROUND

Polyester resins are one of the two generally used chemistries in emulsion aggregation (EA) techniques for constructing toners for imaging devices. For example, sulphonated polyester resins self-assemble to form nanoparticles in an aqueous medium. With at least 4 mole % up to 20 mole % of a sulphonated diol or a sulphonated diacid monomer, the resulting polymer chains in an aqueous medium at elevated temperatures demonstrate chain association and assemble into nanoparticles ranging in size from about 30 to about 50 nm on cooling. The resulting emulsions are used in the EA process to produce micron-sized polyester toner particles. The development of sulphonated polyester EA toners is described, for example, in U.S. Pat. Nos. 6,830,860; 7,312,011; and 7,335,453, herein incorporated by reference in entirety.

U.S. Pat. No. 7,749,672 and U.S. Publ. Nos. 2010/0222521 and 2011/0014564 teach polyesters with a single terminal carboxylic acid group.

SUMMARY

The present disclosure relates to self assembling polyester polymer chains comprising at least one of, two or more adjacent functionalized polymeric repeat units, wherein two adjacent units hereinafter are referred to as a, "functionalized polymeric repeat unit dimer," wherein each unit comprises an esterified acid and alcohol, and wherein a polymeric repeat unit comprises a pendant carboxylic acid or acid salt. In embodiments, self-assembling polyester polymer chains comprise at least one of, three or more adjacent functionalized polymeric repeat units, hereinafter referred to as a, "functionalized polymeric repeat unit trimer," wherein a polymeric repeat unit comprises a pendant carboxylic acid or acid salt. In embodiments, self-assembling polyester polymer chains comprise at least one of, four or more adjacent polymeric repeat units, hereinafter referred to as a, "functionalized polymeric repeat unit tetramer," wherein a polymeric repeat unit comprises a pendant carboxylic acid or acid salt. In embodiments, self-assembling polyester polymer chains comprise at least one of, five or more adjacent functionalized polymeric repeat units, in embodiments, at least one of, six or more adjacent functionalized polymeric repeat units or at least one of, larger numbers of adjacent functionalized polymeric repeat units. A polymeric repeat unit comprising pendant carboxylic acid or acid salt moieties is a functionalized polymeric repeat unit. The remainder of the polymeric repeat units is not functionalized with a carboxylic acid or acid salt moiety and is referred to herein as a, "non-functionalized polymeric repeat unit."

The present disclosure relates to self assembling polyester resins comprising two or more, three or more, four or more, five or more, six or more or a larger number of functionalized polymeric repeat unit dimers, functionalized polymeric repeat unit trimers, functionalized polymeric repeat unit tetramers or larger, or a combination thereof. The functionalized polymer repeat unit dimers, functionalized polymer repeat unit trimers, functionalized polymer repeat unit tetramers and so on are each separated from another functionalized polymer repeat unit dimer, functionalized polymer repeat unit trimer, functionalized polymer repeat unit tetramer and so on by at least about 10, at least about 12, at least about 14, at least about 16 or more non-functionalized polymeric repeat units that do not carry a pendant carboxylic acid or acid salt, that is, such polymeric repeat units are non-functionalized polymeric repeat units that comprise the polyester resin, thereby forming islands of functionalized polymeric repeat units distributed in a background of non-functionalized polymeric repeat units. As known in the art, the non-functionalized polymeric repeat units can carry substituents other than a carboxylic acid or acid salt moiety.

In embodiments, a self-assembling polyester resin of interest comprises a functionalized polymeric repeat unit dimer, functionalized polymeric repeat unit trimer and so on at a terminus or at both termini of a polymer chain.

In embodiments, a polyester resin can comprise plural polyester polymer chains, wherein each polymer chain comprises one or more polymeric repeat unit dimers, polymeric repeat unit trimers, polymeric repeat unit tetramers or combination thereof, wherein a polymeric repeat unit comprises two, three or four, respectively, pendant carboxylic acid or acid salt moieties.

In embodiments, the pendant group comprises a carboxylic acid salt. A suitable counterion for such a salt can be sodium, hydrogen, lithium or potassium.

In embodiments, within the functionalized polymeric repeat unit, any one of the pendant groups can be a carboxylic acid or a salt thereof.

In embodiments, within a functionalized polymeric repeat unit, the pendant moieties or substituents can be located on the alcohol, the acid or the ester reagent comprising a polyester resin.

In embodiments, a method for designing a self-assembling polymer is disclosed including modeling predicted system behavior in an aqueous solution or water, where such modeling includes:
i) defining potential energies and atomic interactions between monomers and polymers of the system, where at least one monomer includes one or more charged or uncharged functional groups,
ii) determining changes in monomer geometry, charge sites and overall water coordination relative to a copolymer as a function of changes in counterions of the one or more charged functional groups on the at least one monomer,
iii) determining probable copolymer configurations in water and generating temperature-dependent parameters based on binding energies between said monomers and water clusters, and
iv) simulating aggregation of the copolymer in water and determining the effects of the charged functional group, copolymer/solvent composition and thermodynamic conditions on interfacial tension as a function of temperature, where steps (i)-(iv) facilitate prediction of probable particle size and shape distribution of copolymer self-assembling aggregates, extracting from constructed modeling one or more rules with respect to optimal parameters required for forming the aggregates, and designing polymers according to the extracted rule(s).

In embodiments, defining step (i) can be performed using, for example, quantum chemical computations; determining step (ii) can be performed, for example, using molecular dynamics optimization, determining step (iii) can be performed, for example, using statistical averaging; and simulating step (iv) can be performed, for example, using coarse-grained dynamic simulations via dissipative particle dynamics (DPD) or a combination thereof, where analysis of the simulations leads to predictable particle size and shape distribution as a function of solids loading and temperature parameters. In embodiments, the analysis can be performed via statistical-mechanical theory of micelle formation. In embodiments, the temperature dependent parameters can be, for example, Flory-Huggins parameters. In embodiments, the statistical averaging can be performed, for example, via Monte-Carlo averaging.

Using a prototype 25-mer, where the 25-mer comprises a short polymer chain of just 25 repeating units, a polyester polymer of interest has a structure including:

$$12[N]\text{-}2[F]_M\text{-}11[N] \quad \text{Formula (I)};$$

$$[F]_T\text{—}[F]_M\text{-}23[N] \quad \text{Formula (II)};$$

$$23[N]\text{—}[F]_M\text{—}[F]_H \quad \text{Formula (III)};$$

or $$11[N]\text{-}3[F]_M\text{-}11[N] \quad \text{Formula (IV)},$$

where $[F]_M$ is a functionalized polymeric repeat unit dimer in the interior of the polymer chain, $[F]_T$ is a functionalized polymeric repeat unit dimer at the tail position or terminus of the polymer chain, $[F]_H$ is a functionalized polymeric repeat unit dimer at the head position or terminus of the polymer chain, and [N] is a non-functionalized polymeric repeat unit, wherein the functional group is a carboxylic acid or salt thereof, and each unit comprises an esterified acid and alcohol. The coefficients indicate the number of dimer units.

In embodiments, as temperature decreases, interfacial tension increases and when the temperature is reduced to about the glass transition temperature ($T_g$), the size of the aggregates can increase. In embodiments, the size of the aggregates is a function of polymer length or the molecular weight (MW) of the polymer. When 2 or more functionalized monomer units are positioned side-by-side in a polymer or at either end of the 25 residue model polymer, that molecule undergoes self-assembly when cooled from elevated temperatures to about the $T_g$.

In embodiments, the polymers form self-assembling aggregates of size commensurate with, for example, polymer length. Thus, a 25-mer of interest forms micelles with a diameter of at least about 38 Å (i.e., mass-median-diameter (MMD) or the log-normal distribution mass median diameter, the MMD is considered to be the average particle diameter by mass) at 330K or at least about 32 Å at 360K. Polymers of greater size form larger self-aggregating micelles and particles.

In embodiments, the interfacial tension of the self-assembling aggregates of the model polymer ranges from about 5 mN/m to about 35 mN/m at 360K. In embodiments, the interfacial tension of the self-assembling aggregates ranges from about 20 mN/m to about 60 mN/m at 330K.

DESCRIPTION OF THE FIGURE

The attached FIGURE and the description thereof are provided to exemplify certain features of the disclosure and are not to be construed as limiting.

FIG. 1 depicts observed interfacial tension of sample polymers at varying temperature, and predicted properties of two modeled oligomers under similar conditions.

DETAILED DESCRIPTION

The present disclosure describes polyester polymers that self-assemble into micelles or particles. The polymers contain at least one of, at least two of, at least three of or more, of two or more adjacent pendant carboxylic acid, or salt thereof, moieties or substituents; in embodiments, three or more adjacent pendant carboxylic acid, or salt thereof, moieties or substituents, or more. In embodiments, a polymer comprises plural groups, where a group comprises two or more residues, in embodiments, three or more residues carrying carboxylic acid, or salt thereof, moieties or substituents. Modeling can be used to confirm the properties and functions of a polymer of interest.

In the disclosure, use of the singular includes the plural unless specifically stated otherwise. In the disclosure, use of, "or," means, "and/or," unless stated otherwise. Furthermore, use of the term, "including," as well as other forms, such as, "includes," and, "included," is not limiting.

As used herein, a, "monomer unit," in the context of the polymers of interest, relates to an acid or ester residue covalently linked by an ester bond to an alcohol residue. Hence, a polyester resin comprises plural monomer units. In the context of the acid/ester and alcohol residues, a polyester resin of interest is an alternating copolymer. Thus, as used herein, "polymer," is synonymous with an alternating copolymer. Polymer also is meant to encompass, for example, a block copolymer, a graft copolymer, a linear polymer, a branched polymer and so on without limitation.

As used herein, a "substituent," is used synonymously with a, "moiety," "side group," or, "functional group," and is meant to indicate a chemical group added to a molecule, for example, to enhance chemical reactivity with other molecules.

In the disclosure, a, "carboxylic acid," includes a salt thereof.

In the disclosure, in the context of a polyester polymer, the components thereof and the reagents for making same, an, "acid," includes an ester; and an, "ester," includes an acid.

"Polyester," as known in the art, is an alternating copolymer obtained, for example, by a polycondensation reaction of an alcohol and an acid or an ester, with the loss of water. For the purposes herein, the residues of a polyester polymer are identified as, "alcohol residues," "acid residues," or, "ester residues," as having been derived from the alcohol and acid or ester reagents. Hence, the polyester polymer comprises substantially, the unreacted portions of the alcohol and acid or ester reactants remaining after the coordinated removal of a water or an alcohol molecule in reaction between an alcohol and an acid or ester. Hence, herein, the residues of a polyester polymer are identified as, "alcohol residues," "acid residues," and, "ester residues," it being understood that those chemical entities comprising the polyester polymer no longer are alcohols, esters and acids but were derived therefrom. It is also understood that to be a reactant in a polyester polymer, an alcohol must be at least a diol and the acid or ester must be at least a diacid or diester, respectively. However, there is no limitation as to the content of the alcohol and acid/ester so long as the resulting polyester polymer can be used in a toner particle, including containing other functional groups.

In the disclosure, "residue," "monomer," and, "unit," are considered equivalent and are used interchangeably.

For the purposes of the instant disclosure, "toner," "developer," "toner composition," and "toner particles," can be used interchangeably, and any particular or specific use and meaning will be evident from the context of the sentence, paragraph and the like in which the word or phrase appears.

For the purposes of the instant application, "about," is meant to indicate a deviation of 20% or less of a stated value or a mean value. Synonyms include, "essentially" and "substantially."

As used herein, optimal or selected parameters include those which are selected for modeling, but are not limited to, temperature, pressure, micelle size, solids loading, $T_g$ or interfacial tension. For example, optimal parameters include that aggregate assembly occurs on cooling from about 360K to about 330K, including that the micelles increase in size with reduction of temperature to about above the $T_g$ of the polymer. However, the actual temperature can vary depending on, for example, constitution and size of a polymer.

In embodiments, a polymer is one which self assembles into micelles and/or particles under suitable incubation conditions. Hence, a polymer is one which assembles to form micelles that are, at 330K, at least about 55 Å, at least about 60 Å, at least about 65 Å in size, or, at 360K, at least about 45 Å, at least about 50 Å, at least about 55 Å in size. In embodiments, a polymer of interest has an interfacial tension at 330K of at least about 30 mJ/m$^2$, at least about 35 mJ/m$^2$, at least about 40 mJ/m$^2$, and at 360K, of at least about 25 mJ/m$^2$, at least about 30 mJ/m$^2$, at least about 35 mJ/m$^2$.

As used herein, "extracted rule(s)," means conventions adapted from the data generated by a modeling method as described herein. Extracted is considered synonymous with, "deduced."

For the purposes of the modeling, in certain circumstances, a monomer unit is an individual alcohol reagent that reacts with either an acid or an ester reagent forming ester bonds therebetween to form a polyester polymer or resin comprising repeating and alternating groups of alcohol and acid/ester. Generally, the alcohol is bifunctional, that is, comprises at least two hydroxyl substituents. The acid or ester also is bifunctional comprising at least two carboxylic acid substituents or ester substituents, respectively. As taught herein certain alcohol, acid and/or ester reagents comprising a polyester resin comprise a pendant carboxylic acid or salt thereof. For the purposes herein, "adjacent," refers to an alcohol and the acid/ester to which the alcohol is covalently bound, or can refer to nearest two alcohols, separated by an acid/ester residue, or to nearest acid/ester residues, separated by an alcohol residue. Hence, for example, the sequence of a relevant portion of a polymer of interest can be, " . . . acid-alcohol-acid/COOH-alcohol-acid/COOH-alcohol-acid . . . "

wherein acid/COOH is an acid residue comprising a pendant carboxylic acid group.

Molecular Simulation

Molecular simulation is a tool for gaining insight into polymer structure and behavior. The modeling and simulation of polymers can be used to address the need for polymer-based nanomaterials for engineering applications. Because of the complex interactions between constituent phases of polymers at the atomic level, a combination of modeling techniques can be beneficial to simulate the behavior of the materials.

Mechanical properties of polymer materials can be determined by a select set of computational methods, including, but not limited to, Computational Chemistry, Multiscale Modeling, Computational Mechanics, Quantum Mechanics, Nanomechanics, Micromechanics, Analytical Micromechanics, Computational Micromechanics and Structural Mechanics, which methods span a wide range of length and time scales. For the smallest length and time scales, Computational Chemistry can be used to predict atomic structure using first principles theory. However, if the length time scales are intermediate, Multiscale Modeling techniques can be employed, which take advantage of Computational Chemistry and Computational Mechanics methods simultaneously for the prediction of the structure and properties of materials.

The structure, energy and chemical behavior of molecules are interrelated, and conformation and structural topology (i.e., "spatial conformation") can play an important role in determining the physical and chemical properties of the polymer. In embodiments, analysis of spatial conformation properties may be performed by Force Field techniques, where such techniques relate some measure of the energy of a molecule to geometric variables, which are assumed to be calculable or observable parameters. In embodiments, Quantum Mechanical Computations may be used to define Force Field to understand atomic interactions of the monomer and polymer systems.

Other Molecular Modeling tools may include, but are not limited to, Molecular Dynamics and Monte Carlo techniques. Molecular Dynamics (MD) can be used for simulating nanostructures. MD can allow predicting interactions between constituent phases at the atomic scale, and involves determining time evolution of a set of interacting atoms followed by integration of corresponding equations of motion.

MD is a statistical mechanics method. A set of configurations is distributed according to a statistical ensemble or statistical distribution function. The trajectories of the motion of the atoms are calculated under the influence of interaction forces of the atoms.

Monte Carlo (MC) simulation is a class of probabilistic mathematical models for the prediction of the behavior and outcome of a system. The outcomes of MC are statistical and are subject to the laws of probability. Generally, MC involves a multidimensional integration over the sample space. Different MC techniques may be used for determination of material properties; classical MC, quantum MC, volumetric MC and kinetic MC. Classical MC involves drawing samples from a probability distribution to obtain thermodynamic properties or minimum energy structures. Quantum MC utilizes random walks to compute quantum mechanical energies and wave functions to solve electronic structure problems. Volumetric MC generates random numbers to determine volumes per atom or to perform geometric analysis. Kinetic MC simulates processes by the use of scaling arguments to establish time scales and includes MD simulation which involves stochastic effects.

Also included in Multiscale Modeling is the use of Coarsed Grained Molecular Dynamics (CGMD), although handshake models, quasicontinuum models and projection models also may be used. In CGMD, not all molecules are represented independently in the computational model.

Instead, clusters of molecules are grouped together to form a bead or a grain. Each bead then is treated as a large molecule in what is then essentially classical MD simulation.

For investigations simulating associations involved in self-assembly of micelles, one approach is to obtain relationships between thermodynamic and statistical mechanical descriptions of a system. Analysis of such simulated systems may be carried out using the Statistical-Mechanical Theory of Micelle Formation (see, e.g., Israelachvili, Intermolecular and Surface Forces, 2007, 2nd ed., Academic Press, New York, N.Y.).

In embodiments, modeling includes, but is not limited to defining potential energies and atomic interactions between monomers and polymers of the system, where at least one monomer includes one or more charged or uncharged functional groups, determining changes in monomer geometry, charge sites and overall water coordination relative to the polymer as a function of changes in counterions of the one or more charged functional groups on the at least one monomer, determining probable polymer configurations in water and generating temperature dependent parameters based on binding energies between said monomers and water clusters, simulating aggregation of the polymer in water and determining the effects of the charged functional group, polymer/solvent composition and thermodynamic conditions on interfacial tension as a function of temperature, where the above steps facilitate predicting probable particle size and shape distribution of polymer self-assembling aggregates.

In embodiments, a defining step can be performed using quantum chemical computations, a determining step can be performed using molecular dynamics optimization, a determining step can be performed using statistical averaging, and a simulating step can be performed using coarse-grained dynamic simulations via dissipative particle dynamics (DPD), where analysis of the simulations leads to predictable particle size and shape distribution as a function of solids loading and temperature parameters. In embodiments, the analysis can be performed via statistical-mechanical theory of micelle formation. In embodiments, the temperature dependent parameters are Flory-Huggins parameters. In embodiments, the statistical averaging is performed via Monte-Carlo averaging.

Model system data may be derived from analysis of existing polymer systems, such as, a sulphonated polyester resin, such as one comprising the structure as set forth in Formula (V), as described in U.S. Pat. Nos. 6,830,860, 7,312,011 and 7,335,453, incorporated herein by reference in entirety. The polymer characteristics of molecules of Formula (V) provide a model for properties and characteristics of polymers comprising two or more carboxylic acid, or salts thereof, side groups, such as those of Formulae (VI) and (VII):

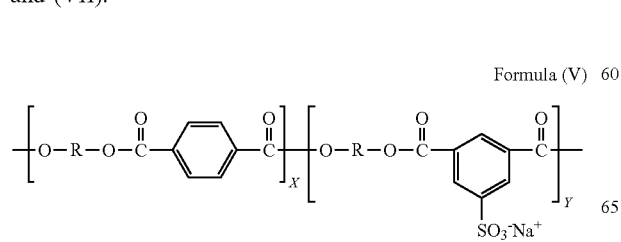

Formula (V)

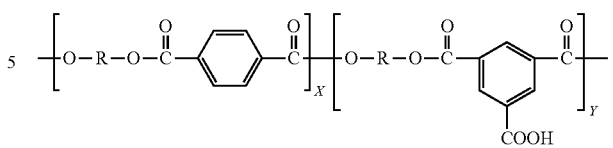

Formula (VI)

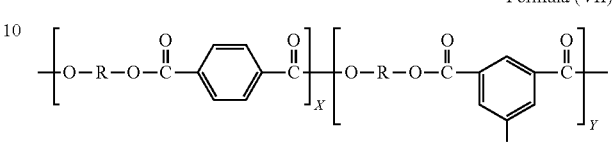

Formula (VII)

where R in Formulae (V), (VI) and (VII) is the non-hydroxyl portions of an alcohol; for Formula (V), and X is from about 0.01 to about 0.99 and Y is from about 0.99 to about 0.01. For Formulae (VI) and (VII), which are representative of polymers of interest, that is, a polymer of interest is not limited to the specific compounds of Formulae (VI) and (VII), in embodiments, X is from about 0.6 to about 0.99, from about 0.7 to about 0.99, from about 0.8 to about 0.99, from about 0.9 to about 0.99, from about 0.95 to about 0.99; and Y is from about 0.01 to about 0.4, from about 0.01 to about 0.3, from about 0.01 to about 0.2, from about 0.01 to about 0.10, from about 0.01 to about 0.05.

Based on analysis of structures having said formulae (V), (VI) or (VII) and using a 25-mer as representative of a polymer, a self-assembling polymer can comprise a structure including:

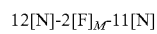  Formula (I);

  Formula (II);

  Formula (III);

or

  Formula (IV), where $[F]_M$ is a functionalized polymeric repeat unit dimer, trimer and so on carrying a pendant group which is a carboxylic acid or salt thereof in the interior of the polymer chain, $[F]_T$ is a functionalized repeat unit dimer, trimer and so on placed at the tail position or terminus of the polymer chain, $[F]_H$ is a functionalized polymeric repeat unit dimer, trimer and so on at the head position or terminus of the polymer chain, and [N] is a non-functionalized polymeric repeat unit, wherein the functional group is a carboxylic acid or a salt thereof. For example, the following structure (Formula VIII) may be [N], with the R group of Formula (VIII) defined as for Formulae (V), (VI) and (VII) above:

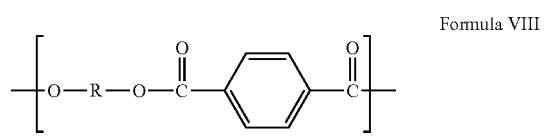

Formula VIII and [F] of Formulae (I), (II), (III) or (IV) may have the following structure (Formula IX), where the R group therein has the same meaning as the R group of Formulae (V), (VI) or (VIII) above:

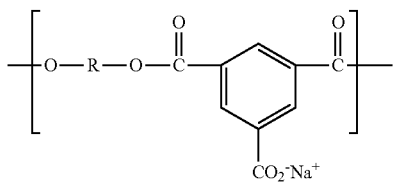

Formula (IX)

As a 25-mer was used as a model to ascertain the properties needed for resins comprising pendant carboxylic acid substituents, it is to be understood that the disclosure is not to be limited to 25-mers and any polyester resin, for example, comprising at least about 50 residues, at least about 100 residues, at least about 150 residues or more comprising adjacent two or more, three or more, or more pendant carboxylic acid or acid salt moieties can be used for constructing toner particles. Similarly, the units, residues or monomers carrying the pendant carboxylic acid or acid salt side groups are not limited to those of Formulae (VIII) and (IX), and essentially any diol, diacid or diester, such as those known and used in making polyester toner, and as provided herein, can be used in the practice of the instant disclosure so long as a resulting polymer comprises at least two or more, three or more, or more adjacent pendant carboxylic acid or acid salt moieties, or plural of at least two or more, three of more, or more adjacent pendant carboxylic acid or acid salt moieties.

Thus, polymers comprising at least one of two or more pendant carboxylic acid or acid salt moieties which are on adjacent monomer repeat units self-assemble as revealed, for example, by the interfacial tension and particle size of the micelles. On cooling from elevated temperatures, micelles or particles form, and with further cooling to a temperature just above the polymer $T_g$, the polymer may show a further increase in micelle size. Micelle size can be determined as known in the art, for example, using a Coulter counter device; and interfacial tension can be determined as known in the art, for example, using a goniometer and the like to assess surface angle, contact angle and the like.

In embodiments, the elevated temperature may be from about 1K to about 5K above the polymer $T_g$, from about 10K above $T_g$, from about 15K above $T_g$, from about 20K above $T_g$, from about 25K above $T_g$, from about 30K above $T_g$ or from about 35K above $T_g$. In embodiments, the elevated temperature is about 360K, where the polymer micelle assemblies are formed as temperature decreases to about 330K.

Toner Composition

As known in the art, toners comprised of polyester resins can contain an amorphous resin, a crystalline resin or both. Either resin form can be branched or crosslinked, which structuring is facilitated using the resins taught herein carrying two or more adjacent pendant carboxylic acid or acid salt side groups.

Hence, as known, a suitable amorphous resin includes a polyester, a polyamide, a polyimide, a polystyrene-acrylate, a polystyrene-methacrylate, a polystyrene-butadiene, a polyester-imide; a carboxylated polyester, a carboxylated polyamide, a carboxylated polyimide, a carboxylated polystyrene-acrylate, a carboxylated polystyrene-methacrylate, a carboxylated polystyrene-butadiene, a carboxylated polyester-imide; a carboxylated polyester resin, a copoly(ethylene-terephthalate)-copoly(ethylene-5-carboxy-isophthalate), a copoly(propylene-terephthalate)-copoly(propylene-5-carboxy-isophthalate), a copoly(diethylene-terephthalate)-copoly(diethylene-5-carboxy-isophthalate), a copoly(propylene-diethylene-terephthalate)-copoly(propylene-diethylene-5-carboxyisophthalate), a copoly(propylene-butylene-terephthalate)-copoly(propylene-butylene-5-carboxy-isophthalate), a copoly(propoxylated bisphenol-A-fumarate)-copoly (propoxylated bisphenol A-5-carboxy-isophthalate), a copoly(ethoxylated bisphenol-A-fumarate)-copoly(ethoxylated bisphenol-A-5-carboxy-isophthalate), a copoly(ethoxylated bisphenol-A-maleate)-copoly(ethoxylated bisphenol-A-5-carboxy-isophthalate); and so on; an alkali form thereof, wherein the alkali can be lithium, potassium or cesium; and combinations thereof.

For use in the practice of the instant disclosure, such amorphous resins can be configured to carry at least two or more adjacent pendant carboxylic acid side groups and/or acid salt side groups as taught herein.

As known in the art, a crystalline resin can comprise a polyester, a polyamide, a polyimide, a polyethylene, a polypropylene, a polybutylene, a polyisobutyrate, an ethylene-propylene copolymer, an ethylene-vinyl acetate copolymer; a polyolefin, a polyisobutyrate, a poly(ethylene-adipate), a poly(propylene-adipate), a poly(butylene-adipate), a poly(pentylene-adipate), a poly(hexylene-adipate), a poly(octylene-adipate), a poly(ethylene-succinate), a polypropylene-succinate), a poly(butylene-succinate), a poly(pentylene-succinate), a poly(hexylene-succinate), a poly(octylene-succinate), a poly(ethylene-sebacate), a poly(propylene-sebacate), a poly(butylene-sebacate), a poly(pentylene-sebacate), a poly(hexylene-sebacate), a poly(octylene-sebacate), a copoly(5-carboxyisophthaloyl)-copoly(ethylene-adipate), a copoly(5-carboxyisophthaloyl)-copoly(propylene-adipate), a copoly (5-carboxyisophthaloyl)-copoly(butylene-adipate), a copoly (5-carboxy-isophthaloyl)-copoly(pentylene-adipate), a copoly(5-carboxy-isophthaloyl)-copoly(hexylene-adipate), a copoly(5-carboxy-isophthaloyl)-copoly(octylene-adipate), a copoly(5-carboxy-isophthaloyl)-copoly(ethylene-adipate), a copoly(5-carboxy-isophthaloyl)-copoly(propylene-adipate), a copoly(5-carboxy-isophthaloyl)-copoly(butylene-adipate), a copoly(5-carboxy-isophthaloyl)-copoly(pentylene-adipate), a copoly(5-carboxy-isophthaloyl)-copoly (hexylene-adipate), a copoly(5-carboxy-isophthaloyl)-copoly(octylene-adipate), a copoly(5-carboxyisophthaloyl)-copoly(ethylene-succinate), a copoly(5-carboxyisophthaloyl)-copoly(propylene-succinate), a copoly(5-carboxyisophthaloyl)-copoly(butylene-succinate), a copoly(5-carboxyisophthaloyl)-copoly(pentylene-succinate), a copoly(5-carboxyisophthaloyl)-copoly(hexylene-succinate), a copoly(5-carboxyisophthaloyl)-copoly(octylene-succinate), a copoly(5-carboxy-isophthaloyl)-copoly (ethylene-sebacate), a copoly(5-carboxy-isophthaloyl)-copoly(propylene-sebacate), a copoly(5-carboxy-isophthaloyl)-copoly(butylenes-sebacate), a copoly(5-carboxy-isophthaloyl)-copoly(pentylene-sebacate), a copoly (5-carboxy-isophthaloyl)-copoly(hexylene-sebacate), a copoly(5-carboxy-isophthaloyl)-copoly(octylene-sebacate), a copoly(5-carboxy-isophthaloyl)-copoly(ethylene-adipate), a copoly(5-carboxy-isophthaloyl)-copoly(propylene-adipate), a copoly(5-carboxy-isophthaloyl)-copoly(butylene-adipate), a copoly(5-carboxy-isophthaloyl)-copoly(pentylene-adipate), a copoly(5-carboxy-isophthaloyl)-copoly (hexylene-adipate), a poly(octylene-adipate); and so on; alkali forms thereof, wherein alkali can be sodium, lithium, potassium or cesium; and combinations thereof.

For use in the practice of the instant disclosure, such crystalline resins can be configured to carry at least two or more adjacent pendant carboxylic acid side groups and/or acid salt side groups as taught herein.

A polyester resin of interest also can be prepared, for example, in a polycondensation reaction using a polyol reactant and a polyacid/polyester reactant; along with a polyol reactant or polyacid/polyester reactant that comprises a pendant carboxylic acid or acid salt side group as taught herein, with an optional catalyst. Generally, a stoichiometric equimolar ratio of polyol and polyacid/polyester reactants can be used, however, in some instances, for example, wherein the boiling point of the polyol is from about 180° C. to about 230° C., an excess amount of polyol reactant can be used and removed during the polycondensation process.

Examples of polyols that can be used to produce a crystalline resin include aliphatic polyols with from about 2 to about 36 carbon atoms, such as, 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali carboxyaliphatic diols such as sodio 2-carboxy-1,2-ethanediol, lithio 2-carboxy-1,2-ethanediol, potassio 2-carboxy-1,2-ethanediol, sodio 2-carboxy-1,3-propanediol, lithio 2-carboxy-1,3-propanediol, potassio 2-carboxy-1,3-propanediol, mixture thereof, and the like.

Examples of polyacids or polyesters for preparing a crystalline resin include oxalic acid, succinic acid, glutaric acid, adipic acid, suberic acid, azelaic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a sodio, lithio or potassio salt of dimethyl-5-carboxy-isophthalate, dialkyl-5-carboxy-isophthalate-4-carboxy-1,8-naphthalic anhydride, 4-carboxy-phthalic acid, dimethyl-4-carboxy-phthalate, dialkyl-4-carboxy-phthalate, 4-carboxyphenyl-3,5-dicarbomethoxybenzene, 6-carboxy-2-naphthyl-3,5-dicarbomethoxybenzene, carboxy-terephthalic acid, dimethyl-carboxy-terephthalate, 5-carboxy-isophthalic acid, and so on; diester, anhydride or alkali thereof; and combinations thereof.

Examples of polyacids or polyesters that can be used for preparing amorphous polyester resins include trimellitic acid, dialkyl fumarate, dialkyl maleate, terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethyl succinate, dimethylfumarate, dimethylmaleate, dimethylglutarate, dimethyladipate, dimethyl dodecylsuccinate; and the like; and mixtures thereof.

Examples of polyols for preparing an amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof.

For use in the practice of the instant disclosure, such polyol, polyacid and polyester reactants for making amorphous or crystalline resins are selected or are configured to carry a pendant carboxylic acid moiety or a carboxylic acid ester moiety, that is, for example, a polyacid can be a tricarboxylic acid.

A polycondensation catalyst, when used, can be selected from tetraalkyl titanates, dialkyltin oxides, such as, dibutyltin oxide, tetraalkyltins, such as, dibutyltin dilaurate, dialkyltin oxide hydroxides, such as, butyltin oxide hydroxide, aluminum alkoxides, alkyl zinc, dialkyl zinc, zinc oxide, stannous oxide or mixtures thereof. The catalyst can be used in amounts of, for example, from about 0.001 mole % to about 5 mole %, from about 0.05 mole % to about 4 mole %, from about 0.1 mole % to about 3 mole % based on the amount and/or nature of the starting polyacid or polyester used to generate the polyester resin.

Optional branching agents can be used and include, for example, a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent can be used in an amount, for example, from about 0.01 to about 5 mole %, from about 0.05 to about 4 mole % from about 0.1 to about 3 mole % of the resin.

When incorporating, for example, a residue that carries a substituent that will be a pendant carboxylic acid or acid salt side group in a polymer, such reagent can be added to the condensation reaction mixture in molar amounts and ratios that approximate the amount of pendant groups in the resulting polymer. Thus, to obtain two or more adjacent carboxylic acid or ester groups in a resin, a suitable reagent comprises, for example, a dimer or trimer of, for example, a tricarboxylic acid, as provided, for example, by Formula (IX) wherein R is derived from a polyol. Then, for example, the tricarboxylic acid dimer, where one acid functional group is protected as an ester to prevent crosslinking during resin synthesis by polycondensation for example, a dimer of Formula (IX), is mixed with a diacid reagent at a about 1:23 ratio, and then that combination is mixed with an equimolar amount of a diol for condensation reaction to form a polyester polymer or resin of interest.

In embodiments, a lower ratio of, for example, tricarboxylic acid reagent to dicarboxylic acid reagent can be used, such as, 1:20, 1:15, 1:10, 1:7.5 and so on.

In embodiments, a 12-mer containing, for example, in sequence, two adjacent tricarboxylic acid-containing monomer units, for example (Formula IX)$_2$, and then ten dicarboxylic acid monomer units, for example, of Formula (VIII)$_{10}$, are reacted with an equimolar amount of a 12-mer containing only dicarboxylic acid residues of, for example, Formula (VIII)$_{12}$. Additional 12-mers can be added successively to incorporate other pendant residues of interest.

In embodiments, a 9-mer, a 10-mer, an 11-mer or larger comprising a terminal functionalized polymeric repeat unit, a terminal functionalized polymeric repeat unit dimer, a terminal functionalized polymeric repeat unit trimer and so on is reacted with another such functionalized oligomer to join the functionalized repeat unit resulting in an oligomer or polymer with a functionalized polymeric repeat unit dimer centrally located in that oligomer. A polymer of interest can be constructed using such building blocks as a design choice. For example, if the above is the first step to yield an oligomer comprising a functionalized polymeric dimer centrally located therein, then additional such terminally functionalized reagents can be added to both ends by joining the non-functionalized polymeric units located at each terminus followed by a next addition of such terminally functionalized reagents at both ends by joining the functionalized polymeric repeat units located at each terminus and so on.

The oligomers can be prepared using standard solid phase materials and methods, and the oligomers can be joined using known chemistries.

Blocking groups, as known in the art, can be added to one terminus to obtain a directed growth of the polymer chain.

In embodiments, an amorphous resin can have a $T_g$ of from about 40° C. to about 75° C., from about 45° C. to about 70° C., from about 50° C. to about 65° C.; a number average molecular weight of from about 5,000 to about 150,000, from about 5,000 to about 130,000, from about 5,000 to about 100,000, a weight average molecular weight of from about 5,000 to about 600,000 from about 6,000 to about 550,000, from about 7,000 to about 500,000, and a dispersity of from about 1 to about 50, from about 2 to about 40, from about 2 to about 35.

A crystalline resin can have a number average molecular weight of from about 1,000 to about 60,000, from about 1,000 to about 50,000, from about 1,000 to about 40,000; a weight average molecular weight of from about 2,000 to about 300,000, from about 4,000 to about 250,000, from about 3,000 to about 200,000; a dispersity of from about 1 to about 50, from about 2 to about 40, from about 3 to about 35; and a melting point of from about 30° C. to about 130° C., from about 35° C. to about 120° C., from about 40° C. to about 110° C.

The self-aggregating resin particles can possess a mass median diameter ($D_{50}$, micelle diameter) of from about 30 Å to about 100 nm, from about 40 Å to about 150 nm, from about 47 Å to about 200 nm at 360K, and from about 44 Å to about 55 Å, from about 55 Å to about 150 nm, from about 67 Å to about 200 nm at 330K. Generally, the polymer chains self-aggregate to form resin particles from about 30 nm in diameter up through 200 nm or greater in diameter. Particle size can be controlled by chemical structure, molecular weight and carboxylic acid content as a design choice, that is, as taught herein, increasing carboxylic acid content affects particle size, for example, by changing the ionic strength and increasing interfacial tension and so on. In embodiments, the self-aggregating resin particles of the present disclosure may exhibit an interfacial tension ($\gamma$) of from about 25 to about 32 mN/m, from about 27 to about 29 mN/m, from about 29 to about 30 mN/m, from about 30 to about 32 mN/m at about 360K, and from about 32 to about 44 mN/m, from about 36 to about 42 mN/m, from about 38 to about 40 mN/m at about 330K. Generally, longer polymers at lower temperatures can comprise higher interfacial tension values, such as, about 50 to about 60 mN/m or more. Interfacial tension can be controlled by carboxylic acid content as a design choice.

Toner may be prepared by any known means, such as, a chemical process as illustrated in U.S. Pat. Nos. 5,290,654, 5,278,020, 5,302,486, 5,308,734, 5,370,963, 5,344,738, 5,403,693, 5,418,108, 5,364,729 and 5,346,797, the disclosures of which are incorporated herein by reference in entirety. Also of interest are emulsion/aggregation methods for making toner, which are known, see, for example, U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,910,387; 5,919,595; 5,916,725; 5,902,710; 5,863,698; 5,925,488; 5,977,210. 6,143,457 and 5,858,601, the disclosures of which are incorporated herein by reference in entirety.

In embodiments relating to an emulsification/aggregation process, a resin can be dissolved in a solvent, and can be mixed into an emulsion medium, for example, water, such as, deionized water, optionally containing a stabilizer, and optionally a surfactant.

Examples of suitable stabilizers include water-soluble alkali metal hydroxides, such as, sodium hydroxide, potassium hydroxide, lithium hydroxide, beryllium hydroxide, magnesium hydroxide, calcium hydroxide or barium hydroxide; ammonium hydroxide; alkali metal carbonates, such as, sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. When a stabilizer is used, the stabilizer can be present in amounts of from about 0.1% to about 5%, from about 0.5% to about 3% by weight of the resin. When such salts are added to the composition as a stabilizer, in embodiments, incompatible metal salts are not present in the composition, for example, a composition can be completely or essentially free of zinc and other incompatible metal ions, for example, Ca, Fe, Ba etc., that form water-insoluble salts. The term, "essentially free," refers, for example, to the incompatible metal ions as present at a level of less than about 0.01%, less than about 0.005% or less than about 0.001%, by weight of the resin. The stabilizer can be added to the mixture at ambient temperature, or can be heated to the mixture temperature prior to addition.

Optionally, a surfactant may be added to the aqueous emulsion medium, for example, to afford additional stabilization to the resin or to enhance emulsification of the resin. Suitable surfactants include anionic, cationic and nonionic surfactants as taught hereinbelow, and as known in the art. When a surfactant is used, the surfactant can be present in amounts of from about 0.1% to about 5%, from about 0.5% to about 3% by weight of the resin.

Following emulsification, toner compositions may be prepared by aggregating a mixture of a resin, a pigment, an optional wax and any other desired additives in an emulsion, optionally, with surfactants as described above and below, and then optionally coalescing the aggregate mixture. A mixture may be prepared by adding an optional wax or other materials, which also may be optionally in a dispersion, including a surfactant, to the emulsion comprising a resin-forming material and a pigments, which may be a mixture of two or more emulsions containing the requisite reagents. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing can be at from about 600 to about 4,000 rpm. Homogenization may be by any suitable means, including, for example, an IKA ULTRA TURRAX T50 probe homogenizer.

Following preparation of the above mixture, often, it is desirable to form larger particles or aggregates, often sized in micrometers, of the smaller particles from the initial polymerization reaction, often sized in nanometers. An aggregating factor may be added to the mixture. Suitable aggregating factors include, for example, aqueous solutions of a divalent cation, a multivalent cation or a compound comprising same.

The aggregating factor, as provided above, may be, for example, a polyaluminum halide, such as, polyaluminum chloride (PAC) or the corresponding bromide, fluoride or iodide; a polyaluminum silicate, such as, polyaluminum sulfosilicate (PASS); or a water soluble metal salt, including, aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or combinations thereof.

In embodiments, the aggregating factor may be added to the mixture at a temperature that is below the $T_g$ of a resin or of a polymer.

The aggregating factor may be added to the mixture components to form a toner in an amount of, for example, from about 0.1 part per hundred (pph) to about 1 pph, in embodiments, from about 0.25 pph to about 0.75 pph, in embodiments, from about 0.3 pph to about 0.7 pph, from about 0.4 pph to about 0.6 pph of the reaction mixture.

To control aggregation of the particles, the aggregating factor may be metered into the mixture over time. For example, the factor may be added incrementally to the mixture over a period of from about 5 to about 240 minutes, in embodiments, from about 30 to about 200 minutes.

Addition of the aggregating factor also may be done while the mixture is maintained under stirred conditions, in embodiments, from about 50 rpm to about 1,000 rpm, in embodiments, from about 100 rpm to about 500 rpm; and at a temperature that is below the $T_g$ of the resin or polymer, in embodiments, from about 30° C. to about 90° C., in embodiments, from about 35° C. to about 70° C. The growth and shaping of the particles following addition of the aggregation factor may be accomplished under any suitable condition(s).

The particles may be permitted to aggregate until a predetermined desired particle size is obtained. Particle size can be monitored during the growth process. For example, samples may be taken during the growth process and analyzed, for example, with a Coulter Counter, for average particle size. The aggregation thus may proceed by maintaining the mixture, for example, at elevated temperature, or slowly raising the temperature, for example, from about 40° C. to about 100° C., and holding the mixture at that higher temperature for from about 0.5 hours to about 6 hours, in embodiments, from about hour 1 to about 5 hours, while maintaining stirring, to provide the desired aggregated particles. Once the predetermined desired particle size is attained, the growth process is halted, for example, by temperature quenching.

The characteristics of the toner particles may be determined by any suitable technique and apparatus. Volume average particle diameter and geometric standard deviation may be measured using an instrument, such as, a Beckman Coulter Multisizer 3, operated in accordance with the instructions of the manufacturer. Representative sampling may occur by taking a sample, filtering through a 25 µm membrane, diluting in an isotonic solution to obtain a concentration of about 10% and then reading the sample, for example, in a Beckman Coulter Multisizer 3.

The growth and shaping may be conducted under conditions in which aggregation occurs separate from coalescence. For separate aggregation and coalescence stages, the aggregation process may be conducted under shearing conditions at an elevated temperature, for example, of from about 40° C. to about 90° C., in embodiments, from about 45° C. to about 80° C., which may be below the $T_g$ of the resin or a polymer.

In embodiments, the aggregate particles, which may include a shell, may be of a size of less than about 10 in embodiments from about 2 to about 8 in embodiments from about 2.5 µm to about 7.5

A toner may contain an amorphous resin in an amount of from about 20 to about 90% of the toner, from about 30 to about 70%, from about 40 to about 50% of the toner; and a crystalline resin in an amount of from about 5 to about 40%, from about 10 to about 30%, from about 15% to about 20% of the toner. A toner can contain a colorant, which can be present in an amount of from about 1 to about 25%, from about 2 to about 20%, from about 3 to about 15% of the toner. A toner can contain a wax, which can be present in an amount of from about 4 to about 25%, from about 4 to about 20% of the toner. A toner can contain other additives, as known in the art, including a wax, a surfactant, a silica, a titania and so on.

Hence, various known suitable colorants, such as, dyes, pigments and mixtures thereof can be present in the toner containing the polyester resin generated with the processes of the present disclosure in an effective amount of, for example, from about 1 to about 25% by weight of the toner or an amount of from about 2 to about 12 weight %, and include carbon black like REGAL 330® and Nipex 35; magnetites, such as Mobay magnetites, MO8029™ and MO8060™; Columbian magnetites; MAPICO BLACK™ and surface treated magnetites; Pfizer magnetites, CB4799™, CB5300™, CB5600™ and MCX6369™; Bayer magnetites, BAYFERROX 8600™ and 8610™; Northern Pigments magnetites, NP-604™ and NP-608™; Magnox magnetites TMB-100™ or TMB-104™; and the like.

As colored pigments, a cyan, magenta, orange, yellow, red, green, brown, blue or mixtures thereof can be used. Specific examples of pigments include phthalocyanine HELIOGEN BLUE L6900™, D6840™, D7080™, D7020™, PYLAM OIL BLUE™, PYLAM OIL YELLOW™ or PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™ and HOSTAPERM PINK E™ from Hoechst, and CINQUASIA MAGENTA™ available from E.I. DuPont de Nemours & Company, and the like. Examples of magentas include 2,9-dimethyl-substituted quinacridone and anthraquinone dye identified in the Color Index as CI 60710, CI Dispersed Red 15, diazo dye identified in the Color Index as CI 26050, CI Solvent Red 19 and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:4, Anthrathrene Blue, identified in the Color Index as CI 69810, Special Blue X-2137 and the like. Illustrative examples of yellows include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™ and cyan components also may be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7, Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF) and Lithol Fast Scarlet L4300 (BASF).

In embodiments, toner compositions may be in dispersions including surfactants. Emulsion aggregation methods where the polymer and other components of the toner are in combination can employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

In embodiments, the surfactant or the total amount of surfactants may be used in an amount of from about 0.01% to about 5% by weight of the toner-forming composition, for example, from about 0.75% to about 4% by weight of the toner-forming composition, in embodiments, from about 1% to about 3% by weight of the toner-forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quaternized polyoxyethylalkylamines, dodecylbenzyl triethyl ammonium chlorides, M1RAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

The toners of the instant disclosure, optionally, may contain a wax, which can be either a single type of wax or a mixture of two or more different types of waxes (hereinafter identified as, "a wax"). A wax can be added to a toner formulation or to a developer formulation, for example, to improve particular toner properties, such as, toner particle shape, charging, fusing characteristics, gloss, stripping, offset properties and the like. Alternatively, a combination of waxes can be added to provide multiple properties to a toner or a developer composition. A wax may be included as, for example, a fuser roll release agent.

The wax may be combined with the resin-forming composition for forming toner particles. When included, the wax may be present in an amount of, for example, from about 1 wt % to about 25 wt % of the toner particles, in embodiments, from about 5 wt % to about 20 wt % of the toner particles.

Waxes that may be used include waxes having, for example, a weight average molecular weight of from about 500 to about 20,000, in embodiments, from about 1,000 to about 10,000. Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550-P™, a low weight average molecular weight polypropylene available from Sanyo Kasei K.K.; plant-based waxes, such as carnauba wax, rice wax, candelilla wax, sumac wax and jojoba oil; animal-based waxes, such as beeswax; mineral-based waxes and petroleum-based waxes, such as montan wax, ozokerite, ceresin wax, paraffin wax, microcrystalline wax and Fischer-Tropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetrastearate; sorbitan higher fatty acid ester waxes, such as sorbitan monostearate; cholesterol higher fatty acid ester waxes, such as, cholesteryl stearate, and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

In embodiments, a sequestering agent or chelating agent may be introduced after aggregation is complete to sequester or extract a metal complexing ion, such as, aluminum from the aggregation process. Thus, the sequestering, chelating or complexing agent used after aggregation is complete may comprise an organic complexing component, such as, ethylenediaminetetraacetic acid (EDTA), gluconal, hydroxyl-2,2'iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; salts of EDTA, such as, alkali metal salts of EDTA, tartaric acid, gluconic acid, oxalic acid, polyacrylates, sugar acrylates, citric acid, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1, 1-diphosphonic acid, aminotrimethylenephosphonic acid, diethylene triaminepentamethylene phosphonic acid, ethylenediamine tetramethylene phosphonic acid, and mixtures thereof.

In embodiments, a resin coating may be applied to the aggregated particles to form a shell thereover. Any polymer or resin described herein or as known in the art may be used as the shell. In embodiments, a polyester amorphous resin latex as described herein may be included in the shell. In embodiments, a polyester amorphous resin latex described herein may be combined with a different resin, and then added to the particles as a resin coating to form a shell.

A shell resin may be applied to the aggregated particles by any method within the purview of those skilled in the art. In embodiments, the resins used to form the shell may be in an emulsion, optionally including any surfactant described herein. The emulsion possessing the resins may be combined with the aggregated particles so that the shell forms over the aggregated particles.

The formation of the shell over the aggregated particles may occur while heating to a temperature from about 30° C. to about 80° C., in embodiments from about 35° C. to about 70° C. The formation of the shell may take place for a period of time from about 5 minutes to about 10 hours, in embodiments from about 10 minutes to about 5 hours.

The shell may be present in an amount from about 1% by weight to about 80% by weight of the toner components, in embodiments from about 10% by weight to about 40% by weight of the toner components, in embodiments from about 20% by weight to about 35% by weight of the toner components.

Following aggregation to a desired particle size and application of any optional shell, the particles then may be coalesced to a desired final shape and/or size, such as, a circular shape, for example, to correct for irregularities in shape and size, the coalescence being achieved by, for example, heating the mixture to a temperature from about 45° C. to about 100° C., in embodiments from about 55° C. to about 99° C., which may be at or above the $T_g$ of the resins used to form the toner particles, and/or reducing the stirring, for example to from about 1000 rpm to about 100 rpm, in embodiments from about 800 rpm to about 200 rpm. Coalescence may be conducted over a period from about 0.01 to about 9 hours, in embodiments from about 0.1 to about 4 hours, see, for example, U.S. Pat. No. 7,736,831.

Optionally, a coalescing agent can be used. Examples of suitable coalescence agents include, but are not limited to, benzoic acid alkyl esters, ester alcohols, glycol/ether-type solvents, long chain aliphatic alcohols, aromatic alcohols, mixtures thereof and the like. Examples of benzoic acid alkyl esters include those where the alkyl group, which can be straight or branched, substituted or unsubstituted, has from about 2 to about 30 carbon atoms, such as decyl or isodecyl benzoate, nonyl or isononyl benzoate, octyl or isooctyl benzoate, 2-ethylhexyl benzoate, tridecyl or isotridecyl benzoate, 3,7-dimethyloctyl benzoate, 3,5,5-trimethylhexyl benzoate, mixtures thereof and the like. Examples of such benzoic acid alkyl esters include VELTA® 262 (isodecyl benzoate) and VELTA® 368 (2-ethylhexyl benzoate) available from Velsicol Chemical Corp. Examples of ester alcohols include hydroxyalkyl esters of alkanoic acids, where the alkyl group, which can be straight or branched, substituted or unsubstituted, and can have from about 2 to about 30 carbon atoms, such as, 2,2,4-trimethylpentane-1, 3-diol monoisobutyrate. An example of an ester alcohol is TEXANOL® (2,2,4-trimethylpentane-1,3-diol monoisobutyrate) available from Eastman Chemical Co. Examples of glycol/ether-type solvents include diethylene glycol monomethylether acetate, diethylene glycol monobutylether acetate, butyl carbitol acetate (BCA) and the like. Examples of long chain aliphatic alcohols include those where the alkyl group is from about 5 to about 20 carbon atoms, such as, ethylhexanol, octanol, dodecanol and the like. Examples of aromatic alcohols include benzyl alcohol and the like.

In embodiments, the coalescence agent (or coalescing agent or coalescence aid agent) evaporates during later stages of the emulsion/aggregation process, such as, during a second heating step, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not affect any properties or the performance of the toner or developer.

The coalescence agent can be added prior to the coalescence or fusing step in any desired or suitable amount. For example, the coalescence agent can be added in an amount of from about 0.01 to about 10% by weight, based on the solids content in the reaction medium, or from about 0.05, or from about 0.1%, to about 0.5 or to about 3.0% by weight, based on the solids content in the reaction medium. Of course, amounts outside those ranges can be used, as desired.

In embodiments, the coalescence agent can be added at any time between aggregation and coalescence, although in some embodiments it may be desirable to add the coalescence agent after aggregation is, "frozen," or completed, for example, by adjustment of pH, for example, by addition, for example, of base.

Coalescence may proceed and be accomplished over a period of from about 0.1 to about 9 hours, in embodiments, from about 0.5 to about 4 hours.

After coalescence, the mixture may be cooled to room temperature, such as, from about 20° C. to about 25° C. The cooling may be rapid or slow, as desired. A suitable cooling method may include introducing cold water in a jacket around the reactor. After cooling, the toner particles optionally may be washed with water and then dried. Drying may be accomplished by any suitable method for drying including, for example, freeze drying.

The toner particles thus formed may be formulated into a developer composition. For example, the toner particles may be mixed with carrier particles to achieve a two component developer composition. The toner concentration in the developer may be from about 1% to about 25% by weight of the total weight of the developer, in embodiments, from about 2% to about 15% by weight of the total weight of the developer, with the remainder of the developer composition being the carrier. However, different toner and carrier percentages may be used to achieve a developer composition with desired characteristics.

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. For example, coatings containing polyvinylidenefluoride, available, for example, as KYNAR 301F™, and/or polymethylmethacrylate (PMMA), for example, having a weight average molecular weight of about 300,000 to about 350,000, such as, commercially available from Soken, may be used. In embodiments, PMMA and polyvinylidenefluoride may be mixed in proportions of from about 30 to about 70 wt % to about 70 to about 30 wt %, in embodiments, from about 40 to about 60 wt % to about 60 to about 40 wt %. The coating may have a coating weight of, for example, from about 0.1 to about 5% by weight of the carrier, in embodiments, from about 0.5 to about 2% by weight of the carrier.

In embodiments, PMMA, for example, may be copolymerized with any desired monomer, so long as the resulting copolymer retains a suitable particle size. Suitable monomers include monoalkyl or dialkyl amines, such as, a dimethylaminoethyl methacrylate, diethylaminoethyl methacrylate, diisopropylaminoethyl methacrylate or butylaminoethyl methacrylate, and the like.

Various effective suitable means can be used to apply the polymer to the surface of the carrier core, for example, cascade roll mixing, tumbling, milling, shaking, electrostatic powder cloud spraying, fluidized bed mixing, electrostatic disc processing, electrostatic curtain processing, combinations thereof and the like. The mixture of carrier core particles and polymer then may be heated to enable the polymer to melt and to fuse to the carrier core. The coated carrier particles then may be cooled and thereafter classified to a desired particle size.

The carrier particles may be prepared by mixing the carrier core with polymer in an amount from about 0.05 to about 10% by weight, in embodiments, from about 0.01 to about 3% by weight, based on the weight of the coated carrier particle, until adherence thereof to the carrier core is obtained, for example, by mechanical impaction and/or electrostatic attraction.

In embodiments, suitable carriers may include a steel core, for example, of from about 25 to about 100 µm in size, in embodiments, from about 50 to about 75 µm in size, coated with about 0.5% to about 10% by weight, in embodiments, from about 0.7% to about 5% by weight of a polymer mixture including, for example, methylacrylate and carbon black, using the process described, for example, in U.S. Pat. Nos. 5,236,629 and 5,330,874.

The toner may include any known charge additives in amounts of from about 0.1 to about 10 wt %, in embodiments, of from about 0.5 to about 7 wt % of the toner. Examples of such charge additives include alkyl pyridinium halides, bisulfates, the charge control additives of U.S. Pat. Nos. 3,944,493; 4,007,293; 4,079,014; 4,394,430; and 4,560,635, the disclosures of each of which are hereby incorporated by reference in entirety, negative charge enhancing additives, such as, aluminum complexes, and the like.

Charge enhancing molecules can be used to impart either a positive or a negative charge on a toner particle. Examples include quaternary ammonium compounds, such as, alkyl pyridinium compounds, such as halides thereof, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on. Such enhancing molecules can be present in an amount of from about 0.1 to about 10%, from about 0.5% to about 8%, from about 1% to about 3% by weight.

Surface additives, such as, flow aids, can be added to the toner compositions of the present disclosure, for example, after washing or drying. Examples of such surface additives include, for example, one or more of a metal salt, a metal salt of a fatty acid, a colloidal silica, a metal oxide, such as, $TiO_2$ (for example, for improved RH stability, tribo control and improved development and transfer stability), an aluminum oxide, a cerium oxide, a strontium titanate, $SiO_2$, mixtures thereof and the like. Examples of such additives include those disclosed in U.S. Pat. Nos. 3,590,000; 3,720,617; 3,655,374; and 3,983,045, the disclosures of each of which are hereby incorporated by reference in entirety. Surface additives may be used in an amount of from about 1 to about 10 wt %, from about 0.5 to about 7 wt %, 0.1% to about 5% of the toner.

Other surface additives include lubricants, such as, a metal salt of a fatty acid (e.g., zinc or calcium stearate) or long chain alcohols, such as, UNILIN 700 available from Baker Petrolite and AEROSIL R972® available from Degussa. The coated silicas of U.S. Pat. Nos. 6,190,815 and 6,004,714, the disclosures of each of which hereby are incorporated by reference in entirety, also can be present. The additive can be present in an amount of from about 0.05 to about 5%, and in embodiments, of from about 0.1 to about 2% of the toner, which additives can be added during the aggregation or blended into the formed toner product.

Silica, for example, can enhance toner flow, tribo control, admix control, improved development and transfer stability and higher toner blocking temperature. Zinc, calcium or magnesium stearate also can provide developer conductivity, tribo enhancement, higher toner charge and charge stability. The external surface additives can be used with or without a coating or shell.

The gloss of a toner may be influenced by the amount of retained metal ion, such as, $Al^{3+}$, in a particle. The amount of retained metal ion may be adjusted further by the addition of a chelator, such as, EDTA. In embodiments, the amount of retained catalyst, for example, $Al^{3+}$, in toner particles of the present disclosure may be from about 0.1 pph to about 1 pph, in embodiments, from about 0.25 pph to about 0.8 pph, in embodiments, about 0.5 pph. The gloss level of a toner of the instant disclosure may have a gloss, as measured by Gardner Gloss Units (ggu), of from about 20 ggu to about 100 ggu, in embodiments, from about 50 ggu to about 95 ggu, in embodiments, from about 60 ggu to about 90 ggu.

Hence, a particle can contain at the surface one or more silicas, one or more metal oxides, such as, a titanium oxide and a cerium oxide, a lubricant, such as, a zinc stearate and so on. In some embodiments, a particle surface can comprise two silicas, two metal oxides, such as, titanium oxide and cerium oxide, and a lubricant, such as, a zinc stearate. All of those surface components can comprise about 5% by weight of a toner particle weight. There can also be blended with the toner compositions, external additive particles including flow aid additives, which additives may be present on the surface of the toner particles. Examples of these additives include metal oxides like titanium oxide, tin oxide, mixtures thereof, and the like; colloidal silicas, such as AEROSIL®, metal salts and metal salts of fatty acids, including zinc stearate, aluminum oxides, cerium oxides, and mixtures thereof. Each of the external additives may be present in embodiments in amounts of from about 0.1 to about 5 wt %, or from about 0.1 to about 1 wt %, of the toner. Several of the aforementioned additives are illustrated in U.S. Pat. Nos. 3,590,000, 3,800,588, and 6,214,507, the disclosures which are incorporated herein by reference.

Toners may possess suitable charge characteristics when exposed to extreme relative humidity (RH) conditions. The low humidity zone (C zone) may be about 10° C. and 15% RH, while the high humidity zone (A zone) may be about 28° C. and 85% RH.

Toners of the instant disclosure also may possess a parent toner charge per mass ratio (Q/M) of from about −5 μC/g to about −90 μC/g, and a final toner charge after surface additive blending of from about −15 μC/g to about −80 μC/g.

The dry toner particles, exclusive of external surface additives, may have the following characteristics: (1) volume average diameter (also referred to as "volume average particle diameter") of from about 2.5 to about 20 μm, in embodiments, from about 2.75 to about 10 μm, in embodiments, from about 3 to about 7.5 μm; (2) number average geometric standard deviation (GSDn) and/or volume average geometric standard deviation (GSDv) of from about 1.18 to about 1.30, in embodiments, from about 1.21 to about 1.24; and (3) circularity of from about 0.9 to about 1.0 (measured with, for example, a Sysmex FPIA 2100 analyzer), in embodiments, from about 0.95 to about 0.985, in embodiments, from about 0.96 to about 0.98.

The resulting developer containing a toner comprising a polyester resin of interest can have any of a number of properties including any one or more of a fixing temperature of from about 90° C. to about 110° C.; a fusing latitude of from about 50° C. to about 90° C.; avoids image development document offset at a temperature of from about 60° C. to about 70° C.; substantially no vinyl offset; a projection efficiency of from about 75 to about 95%; gloss of from about 10 to about 90 gloss units; and so on.

Other desirable characteristics of a toner include storage stability, particle size integrity, low melting temperature, high rate of fusing to the substrate or receiving member, sufficient release of the image from the photoreceptor, nondocument offset, use of smaller-sized particles and so on, and such characteristics can be obtained by including suitable reagents, suitable additives or both, and/or preparing the toner with particular protocols and reagents.

The following Examples are provided to illustrate further various species of the present disclosure, it being noted that the Examples are intended to illustrate and not to limit the scope of the present disclosure.

EXAMPLES

Example 1: Molecular Modeling

The goal was to validate crystalline/amorphous polyester polymers containing a carboxylic acid, or salt thereof, using resins comprising the sulphonated functional group as a model.

The initial phase of the modelling was to develop a theoretical understanding of the mechanisms that form stable emulsions of sulphonated polyester polymers in an aqueous solution. Once the sulphonated system was accurately modelled and was in agreement with experimental data, the same approach was applied to the carboxylic acid functionalized system.

The first model polymer system studied was copoly (terephthalate)-copoly-(5-sulpho-isophthalate) as generally depicted in Formula (V):

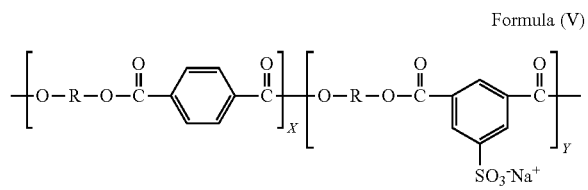

Formula (V)

where $R=CH_2-CH_2$; $X=0.08-0.99$; and $Y=0.01-0.20$.

To fully model the sulphonated functionalized system and the behaviour thereof in water at elevated temperatures, molecular modelling was conducted in sequential phases. Phase I consisted of quantum chemical computations to define force fields and understand all atomic interactions of the monomers and polymer system. A model 25 monomer unit chain was defined consisting of 24 non-sulphonated units and one sulphonated unit. Phase II consisted of conducting Molecular Dynamics Optimization analysis of geometries for the monomer and chains. That determined how the changes in counter cations of the sulphonate functionality of $Na^+$, $H^+$, $Li^+$ or $K^+$ might influence the monomer geometry, charge sites and overall water coordination to the resin. Extensive statistical Monte-Carlo averaging (Phase III) of the block copolymer configurations identified the most probable conformations in water solution and generated temperature-dependent Flory-Huggins parameters using binding energies between various monomers and water clusters. That was followed by systemic Coarse-Grained Dynamic Simulations using dissipative particle dynamics (DPD) methods (Phase IV) to obtain self-assembly of the block copolymers in water solution and studied the effects of sulphonation, copolymer/solvent ($H_2O$) composition and thermodynamic conditions on interfacial tension.

Those analyses yielded an algorithm that predicted molecular behaviour based on the parameters considered. To confirm the power of the model, resins of defined composition were produced and the properties thereof measured.

Then, a theoretical resin was produced using the derived algorithm considering the properties of the reagents used. Similar polymerization reactions were used for the actual reactions and the simulation.

To prepare the sulfonated polyester oligomers, a one liter Parr reactor equipped with a bottom drain valve, double turbine agitator and distillation receiver with a cold water condenser was charged with 361 grams of dimethyl-terephthalate, 20.76 grams of dimethyl-5-sulfo-isophthalate sodium salt, 274.6 grams of 1,2-propanediol (1 mole excess), 31 grams of diethylene glycol and 0.8 gram of tetrabutyl titanate as the catalyst. The reactor was then heated to 165° C. with stirring for 16 hours whereby 115 grams of distillate was collected in the distillation receiver, which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 120 grams of distillate in the distillation receiver, which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 18 grams of 1,2-propanediol were collected. The reactor was then purged with nitrogen to atmospheric pressure, and the polymer discharged through the bottom drain onto a container cooled with dry ice to yield 454 grams of copoly(1,2-propylene-diethylene-terephthalate) copoly(1,2-propylene-diethylene-5-sulfo-isophthalate) sodium salt resin. The glass transition temperature of the resin resulting was then measured to be 53° C. (onset) utilizing the 910 Differential Scanning Calorimeter available from E.I. DuPont operating at a heating rate of 10° C. per minute. The number average molecular weight was measured to be 2,050 grams per mole and the weight average molecular weight was measured to be 3,400 grams per mole using tetrahydrofuran as the solvent and obtained with the 700 Satelite WISP gel permeation chromatograph available from Waters Company equipped with a styrogel column. About 1.8 Grams of this sulfonated polyester resin was then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 kg/cm$^2$, and where the barrel temperature heated from 20° C. to 130° C. at a rate of 10° C. per minute. A softening point of 68° C., beginning of flow temperature ($T_i$) of 82° C. and flow temperature T2 of 98° C. were obtained.

The polyester resin was then fritz milled into smaller particle sizes for emulsion preparation. A 5.2% of aqueous colloidal sulfonate polyester resin was prepared by first heating 189.6 grams of deionized water to 90° C. with stirring, and then adding thereto 10.4 grams of the sulfonated polyester resin obtained above. The temperature and stirring of the mixture was continued for a duration of 3 hours. Then it was cooled and filtered through a 20 micron stainless steel screen (#625 mesh). A sample is taken and measured by the Nanotrac particle sizer to have a $D_{50}$ of approximately 17.8 nm.

For a 10% emulsion, 180.0 grams of deionized water were heated to 90° C. with stirring, and then adding thereto 20.0 grams of the sulfonated polyester resin obtained above. The temperature and stirring of the mixture was continued for a duration of 3 hours. Then it was cooled and filtered through a 20 micron stainless steel screen (#625 mesh). A sample is taken and measured by the Nanotrac particle sizer to have a $D_{50}$ of approximately 12.6 nm.

For a 32.0% emulsion, 136.0 grams of deionized water were heated to 90° C. with stirring, and then adding thereto 64.0 grams of the sulfonated polyester resin obtained above. The temperature and stirring of the mixture was continued for a duration of 3 hours. Then it was cooled and filtered through a 20 micron stainless steel screen (#625 mesh). A sample is taken and measured by the Nanotrac particle sizer to have a $D_{50}$ of approximately 26.5 nm.

Analysis of the simulation data by Statistical-Mechanical Theory of Micelle Formation (Israelachvili, 2007) (Phase V) accurately reproduced the measured interfacial tensions at various temperatures and predicted the most probable particle size and shape distribution of the block copolymer aggregate generated by the simulation that was in full agreement with experimental data of the actually produced polymers.

Results

The key findings from the molecular modelling of the sulphonate system show that the polymer chains undergo self-assembly, including that the critical parameter that enables stable self-assembly is the change in interfacial tension as a function of temperature. For example, as the temperature decreases, interfacial tension increases due to the polymer chains associating into a micelle structure through chain alignment and stabilization of the hydrophilic sulphonate groups at the interface with water. As the micelles grow due to continual aggregation, a dispersed second phase of particles emerges. Further, the size of the aggregates or nanoparticles is also a function of the polymer chain length.

FIG. 1 summarizes data obtained from sample oligomers and predicted properties of hypothetic oligomers. Thus, three sulphonated 25-mers were made, each composed of one monomer comprising a pendant sulphonate group and 24 non-sulphonated groups, hence, the designation, "SPE4%." Three different sulphonate oligomer emulsions were prepared at 5.2 wt %, 10 wt % and 32 wt % solids loading. The interfacial tension was determined for each emulsion at a number of temperatures. That data yielded the three curves, lines presented in FIG. 1 with the square, circle and diamond data points. It can be seen that under the test conditions, interfacial tension was independent of solids loading as the three curves are nearly superimposed on one another having substantially similar slope.

Two models, that derived herein, identified in the FIGURE as, "mj/m2," and the other of Bicerano as provided in Israelachvili, supra, and Bicerano, "Prediction of Polymer Properties," 3$^{rd}$ ed. Marcel Dekker, 2002, were used to generate simulations of a similar sulphonated 25-mer at 5 wt % solids loading, and the predicted interfacial tension values at various temperatures were plotted as well, the curve defined by the open squares using the algorithm derived in the instant studies and the curve defined by the triangles using the modelling paradigm of Bicerano.

The data and the predicted data confirmed the accuracy of the derived molecular model to identify conditions needed for self-assembly of a functionalized reagent.

Example 2: Carboxylic Acid Functionality

The model above was used to evaluate the behavior of another polymer, except that the sulphonate functional group was replaced with a carboxylic acid or the sodium salt of the carboxylic acid, as set forth in Formulae (VI) and (VII), respectively:

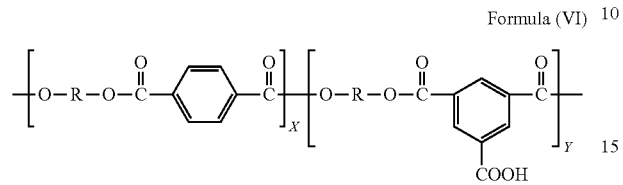

Formula (VI)

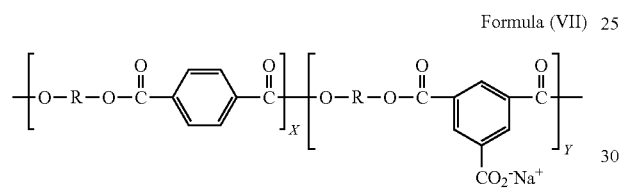

Formula (VII)

where R=CH$_2$—CH$_2$; X=0.06-0.99; and Y=0.01-0.40.

Similar to the sulphonate system, various phases of molecular modelling as provided above were conducted to take into account all of the interactions in the system. On completion of Phase V, self assembly simulations were converged for the model 25-mer (e.g., Formula (VII)) unit polymer where the solids loading of the polymer in water was 11 wt % solids at two temperatures, 330K (57° C.) and 360K (87° C.).

All polymer chains were either double or triple functionalized within the chain length of 25 monomer units.

Self-assembled chains were obtained at 11 wt % loading in water at 360K. When two or three carboxylic acid functionalized monomer units are placed in the middle of the chain, denoted as 12[N]-2[F]$_M$-11[N] and 11[N]-3[F]$_M$-11[N], respectively, self-assembly was observed. The abbreviation [N] denotes the repeat unit without a functional group, while the abbreviation [F]$_M$ denotes the carboxylic acid monomer repeat unit located in the middle of the polymer chain.

Further, when two functionalized monomer units are located at the tail or head position of the 25 unit polymer chain, self assembly of the polymer micelles is observed. The assembly occurs on cooling from 360K to 330K, including that the micelles grow in size with the reduction of temperature to just above the T$_g$ of the polymer.

Higher solids loading amounts can be used to obtain self-assembly of other reactants with the appropriate control of reaction conditions.

Table 1 illustrates the interfacial tension γ and spherical micelle diameter values for several double-functionalized and triple-functionalized polymer chains where the functionality is a carboxylic acid group.

TABLE 1

Interfacial Tension Values at 360K and 330K for Double and Triple Functionalized Chains

| 25 Monomer Chains | Interfacial Tension (γ) (mJ/m$^2$) | Micelle Diameter D$_{50}$[Å] | Interfacial Tension (γ) (mJ/m$^2$) | Micelle Diameter D$_{50}$[Å] |
|---|---|---|---|---|
| | Double Functionalized Polymer Chains | | | |
| | T = 360K | | T = 330K | |
| 12[N]-2[R]$_M$-11[N] | 31.9(4) | 52 | 40.0(9) | 77 |
| 11[N]-[F]$_M$-[N]-[F]$_M$-11[N] | 19.9(3) | 35 | 26.3(6) | 47 |
| [F]$_T$-23[N]-[F]$_H$ | 20.8(3) | 36 | 29.8(7) | 53 |
| [F]$_T$-[F]$_M$-23[N] | 30.4(4) | 50 | 35.8(8) | 66 |
| 23[N]-[F]$_M$-[F]$_H$ | 29.0(4) | 47 | 35.0(8) | 64 |
| | Triple Functionalized Polymer Chains | | | |
| 11[N]-3[F]$_M$-11[N] | 28.2(6) | 38 | 32.0(7) | 44 |
| [F]$_T$-11[N]-[F]$_M$-11[N]-[F]$_H$ | 17.9(2) | 29 | 19.4(4) | 32 |

The values in parentheses represent one standard deviation. Thus, 31.9(4) means 31.9 ± 0.4, which also means that there is a 68.3% probability that the next measurements will fall within the interval of 31.5 and 32.3.

The series of double-functionalized chains includes the options where a functionalized monomer unit is at both ends, 1[F]$_T$-23[N]-1[F]$_H$, or when plural functionalized monomer units are together at the beginning of the chain, 1[F]$_T$-1[F]$_M$-23[N], or at the end of the chain, 23[N]-1[F]$_M$-1[F]$_H$, or in the middle of the chain, but separated by one non-functionalized monomer unit; 11[N]-1[F]$_M$-1[N]-1[F]$_M$-11[N], or in the middle of the chain side by side; 12[N]-2[F]$_M$-11[N]. For the cases when three functionalized monomer units were modelled per 25 monomer unit chain, the options were either when the functionalized monomer unit was at both ends and also in the middle 1[F]$_T$-11[N]-1[F]$_M$-11[N]-1[F]$_H$ or when all three functionalized monomer units were together in the middle of the polymer chain; 11[N]-3[F]$_M$-11[N].

Conclusions

For the starting temperature of 360K, the largest micelles were modelled for the double functionalized polymers when the functionalized monomer units are in the middle of the polymer chain and side by side (case 1 with 52 Å) or when two functionalized monomer units are together at either end of the chains (cases 4 and 5 with 50 Å and 47 Å, respectively). As long as the two functionalized monomer units are adjacent to each other, micelles can grow to approximately 5 nm in size even if placed at the beginning or at the end of the polymer chain. When the functionalized monomer units are separated by one or more non-functionalized monomer units, the micelles was reduced significantly in size (cases 2 and 3 with 35 Å and 36 Å, respectively). With separation of just one non-functionalized monomer unit, the corresponding micelle size was reduced slightly. Larger micelle size also is correlated with higher interfacial tension. As the temperature decreases, the interfacial tension increases and the micelles grow in size due to phase separation of the polymer chains from solution.

Example 2: Carboxylic Acid Toner

A polymer having the basic repeating structure of 12[N]-2[R]-11[N], where N is a non-functionalized residue and R is a residue comprising a pendant carboxylica acid group, 35% solids, crystalline polyester (M$_w$23,300, M$_n$=10,500, Tm=71° C., 35% solids), 2% surfactant (DOWFAX® 3A1, Dow Chemical Company), polyethylene wax emulsion ($T_m$=90° C., 30% solids, The International Group, Inc. (IGI)), black pigment (Nipex 35, Evonik Industries, Essen, DE) and pigment PB 15:3 dispersion are mixed in a reactor, then pH adjusted to 4.2 using 0.3 M nitric acid. The slurry then is homogenized through a CAVITRON homogenizer with the use of a recirculating loop for a total of 60 minutes, where during the first 8 minutes, coagulant consisting of aluminium sulphate in deionized (DI) water is added inline. The reactor rpm is increased from 100 rpm to set mixing at 300 rpm once all the coagulant is added. The slurry is then aggregated at a batch temperature of 42° C. During aggregation, a shell comprised of the same carboxylic acid resin as in the core with the pH adjusted to 3.3 with nitric acid is added to the batch. The batch is heated further to achieve the targeted particle size. Once the target particle size is reached, the aggregation step is frozen with pH adjustment to 7.8 using NaOH and EDTA. The process is continued with the reactor temperature ($T_r$) being increased to achieve 85° C. At the desired temperature, the pH is adjusted to 7.0 using a nitric acid and a Taycapower BN2060 surfactant (Tayca Corp.) solution where the particles coalesce. After about two hours, particles achieved >0.965 circularity and are quench cooled using a heat exchanger to yield black toner particles.

All references cited herein are herein incorporated by reference in entirety.

It will be appreciated that several of the above-disclosed and other features and functions, or alternatives thereof, may be desirably combined into many other different systems or applications. Unless specifically recited in a claim, steps or components of claims should not be implied or imported from the specification or any other claims as to any particular order, number, position, size, shape, angle, color or material. Also, various presently unforeseen or unanticipated alternatives, modifications, variations or improvements therein may be subsequently made by those skilled in the art, and are intended to be encompassed by the following claims.

We claim:

1. A polyester polymer comprising 25 to 150 monomer units, the polyester polymer being prepared from at least one block oligomer of the monomer units, wherein a first monomer unit comprises an acid residue and an alcohol residue, wherein the first monomer unit comprises either a single pendant carboxylic acid side group or a single pendant carboxylic acid salt side group on said acid residue, wherein a second monomer unit comprises an acid residue and an alcohol residue neither of which is functionalized, wherein the at least one block oligomer comprises two adjacent first monomers centrally located in the at least one block oligomer and wherein the polyester polymer comprising the 25 to 150 monomer units forms a micelle of predetermined mass median diameter at 360K.

2. The polyester polymer of claim 1, wherein the polyester polymer comprises 25 to 100 monomer units.

3. The polyester polymer of claim 2, wherein the polyester polymer comprises 25 to 50 monomer units.

4. The polyester polymer of claim 2, wherein the micelle formed at 360K has a predetermined mass median diameter of 30 Å to 100 nm.

5. The polyester polymer of claim 3, wherein the micelle formed at 360K has a predetermined mass median diameter of 40 Å to 150 nm.

6. The polyester polymer of claim 3, wherein the micelle formed at 360K has a predetermined mass median diameter of 47 Å to 200 nm.

7. A toner particle comprising the polyester polymer of claim 1, the polyester polymer comprising 25 to 150 monomer units, wherein a monomer unit comprises an acid residue and an alcohol residue, wherein at least two adjacent monomer units each comprise either a single pendant carboxylic acid side group or a single pendant carboxylic acid salt side group on said acid residue, wherein the remaining monomer units are non-functionalized, and wherein the polyester polymer comprising 25 to 150 monomer units forms a micelle of predetermined mass median diameter at 360K.

8. The toner particle of claim 7, wherein the polyester polymer comprises 25 to 100 monomer units.

9. The toner particle of claim 8, wherein the polyester polymer comprises 25 to 50 monomer units.

10. The toner particle of claim 8, wherein the micelle formed at 360K has a predetermined mass median diameter of 30 Å to 100 nm.

11. The toner particle of claim 9, wherein the micelle formed at 360K has a predetermined mass median diameter of 40 Å to 150 nm.

12. The toner particle of claim 9, wherein the micelle formed at 360K has a predetermined mass median diameter of 47 Å to 200 nm.

13. A developer comprising the toner particle of claim 7.

14. A toner particle comprising a polyester polymer core and a resin shell disposed over the core, the polyester polymer comprising 25 to 150 monomer units, wherein a monomer unit comprises an acid residue and an alcohol residue, wherein at least two adjacent monomer units each comprise either a single pendant carboxylic acid side group or a single pendant carboxylic acid salt side group on said acid residue, wherein the remaining monomer units are non-functionalized, and wherein the polyester polymer comprising 25 to 150 monomer units forms a micelle of predetermined mass median diameter at 360K, wherein the resin shell is formed from a polymer having a weight average molecular weight of about 300,000 to about 350,000.

15. The toner particle of claim 14, wherein the resin shell is formed from a polymer selected from the group consisting of a fluoropolymer, terpolymers of styrene, methyl methacrylates, silanes, tetrafluoroethylenes, and polymethylmethacrylate (PMMA).

16. The toner particle of claim 14, wherein the resin shell is formed from a mixture of PMMA and polyvinylidenefluoride in a weight ratio range of from about 30 to about 70 wt % to about 70 to about 30 wt %.

17. The toner particle of claim 14, wherein the polyester polymer comprises 25 to 100 monomer units.

18. The toner particle of claim 14, wherein the micelle formed at 360K has a predetermined mass median diameter of 30 Å to 100 nm.

* * * * *